W. W. Armington,
Lemon Squeezer.
Nº 50,199. Patented Sep. 26, 1865.
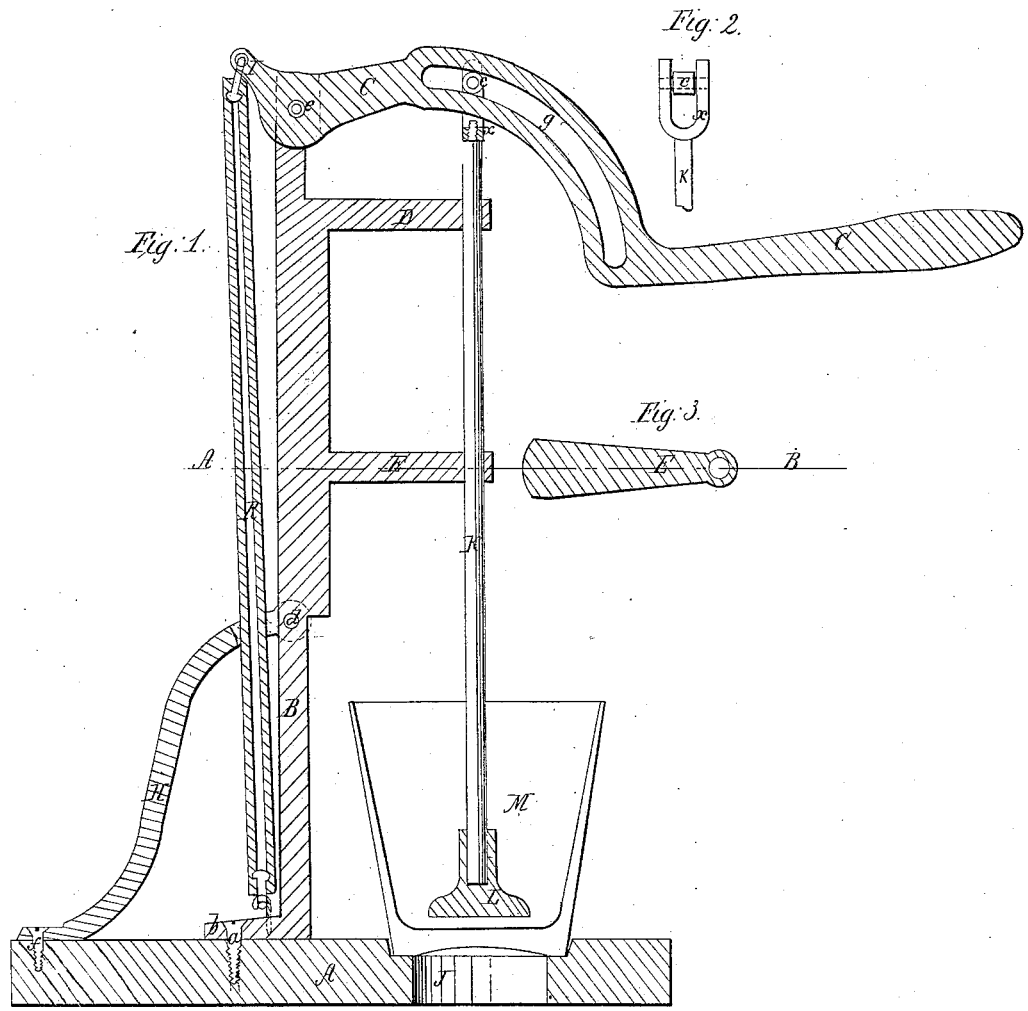

UNITED STATES PATENT OFFICE.

WILLIAM W. ARMINGTON, OF LOWELL, MASSACHUSETTS, ASSIGNOR TO GEO. E. MITCHELL, OF SAME PLACE.

FRUIT-MASHER OR LEMON-SQUEEZER.

Specification forming part of Letters Patent No. 50,199, dated September 26, 1865.

*To all whom it may concern:*

Be it known that I, WILLIAM W. ARMINGTON, of Lowell, county of Middlesex and State of Massachusetts, have invented a new and Improved Device for Mashing Lemons or other Fruit, to obtain the juice for flavoring drinks; and I do hereby declare that the following is a full and exact description thereof, which will enable others skilled in the art to make and use the same, reference being had to the accompanying drawings, forming a part of this specification, in which—

Figure 1 is a vertical central section of my invention. Fig. 2 is a detached view of the yoke and roller pertaining to the same. Fig. 3 is a cross-section of one of the arms through which the spindle slides up or down.

The nature of my invention consists in the employment of a plunger or fruit-masher secured to the lower end of a perpendicular sliding spindle, and operated by a lever connected with the top end of the same by means of a yoke and roller, said roller working in a curved slot made in the shank of the lever, when the same is used in connection with a tumbler or other similar and suitable vessel for mashing fruit to obtain the juice for flavoring drinks.

In the drawings, A is a platform to which the stand B is fastened by a screw or screws, a, passing through the foot b. A lever, C, is hinged to the top of the stand B by the pin e. Arms D and E project from the front side of the stand B, and holes or bearings P are near the outer ends, through which the spindle K slides up or down. A plunger or masher, L, is secured to the lower end of the spindle K. The top end of the spindle is connected with the working-lever C by means of a yoke, X, and a roller, c, revolving on a pin, o. A horn, I, projects from the hinged end of the lever C, to which the top end of a rubber spring, R, is attached, and a hook in the foot b of the stand B holds the bottom end of the said spring. A hole or opening, J, in the platform A, beneath the tumbler M, provides for the removal of the masher L and spindle K by disconnecting the latter from the yoke X and withdrawing it through the hole J. The brace H prevents the stand B from tipping backward or forward when working the apparatus.

The object of my invention may be easily seen: When the juice of fruit is desired for flavoring drink, a portion of a lemon or other fruit is placed within the tumbler or other vessel beneath the masher L. Downward motion is given to the same and the spindle K by power applied to the lever C, mashing the fruit sufficiently to allow the juice to mix with water or other liquid. The spring R serves to withdraw the masher and spindle from the tumbler, which may be removed from the platform A. A spiral or other spring or a weight may be used for withdrawing the masher from the tumbler.

I claim—

The platform A, the stand B, with its arms D and E, the lever C, the horn I, the yoke X, the roller c, the spindle K, the masher L, the spring R, and brace H, the whole arranged to operate substantially as herein set forth and shown, for the purpose specified.

WILLIAM W. ARMINGTON.

In presence of—
GEO. E. MITCHELL,
JOHN E. CRANE.